No. 612,447. Patented Oct. 18, 1898.
A. F. WARREN.
LUBRICATING DEVICE FOR JOURNAL BOXES.
(Application filed Jan. 17, 1898.)

(No Model.)

Witnesses:
Franck L. Ourand.

Inventor:
Alpheus F. Warren,
by Louis Bagger & Co.
Attorneys

THE NORRIS PETERS CO., PHOTO-LITHO., WASHINGTON, D. C.

United States Patent Office.

ALPHEUS FRENCH WARREN, OF BUTLER, OHIO, ASSIGNOR OF ONE-HALF TO JOHN L. BARR, OF SAME PLACE.

LUBRICATING DEVICE FOR JOURNAL-BOXES.

SPECIFICATION forming part of Letters Patent No. 612,447, dated October 18, 1898.

Application filed January 17, 1898. Serial No. 667,011. (No model.)

*To all whom it may concern:*

Be it known that I, ALPHEUS FRENCH WARREN, a citizen of the United States, residing at Butler, in the county of Richland and State of Ohio, have invented new and useful Improvements in Lubricating Devices for Journal-Boxes, of which the following is a specification.

My invention relates to oil-feeding devices for the journal-boxes of steam-railway, street, and other cars, which boxes are provided with roller-bearings for the purpose of reducing friction.

The object of the invention is to provide improved means for feeding oil to such boxes, whereby the flow of oil may be regulated or cut off, as desired.

The invention consists in the novel construction and combination of parts hereinafter fully described and claimed.

Figure 1:
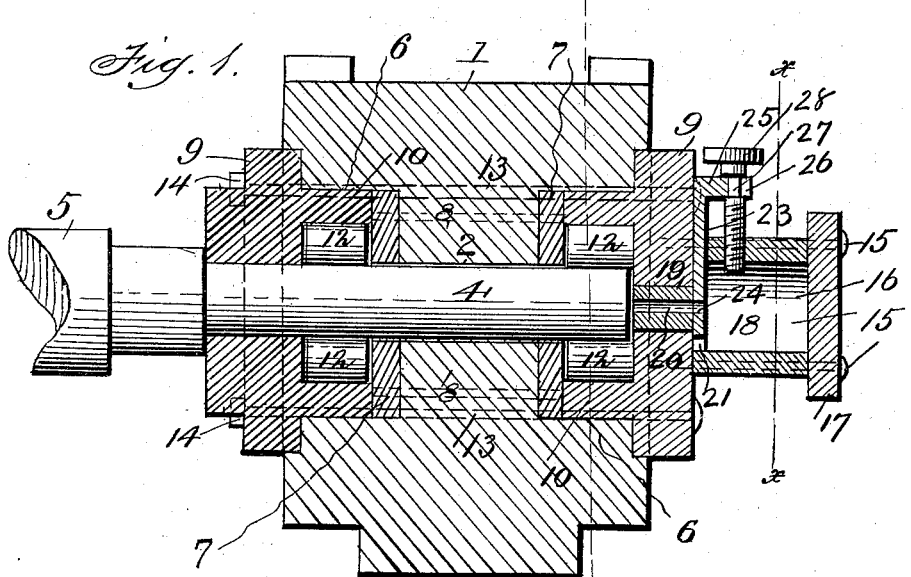
Figure 2:
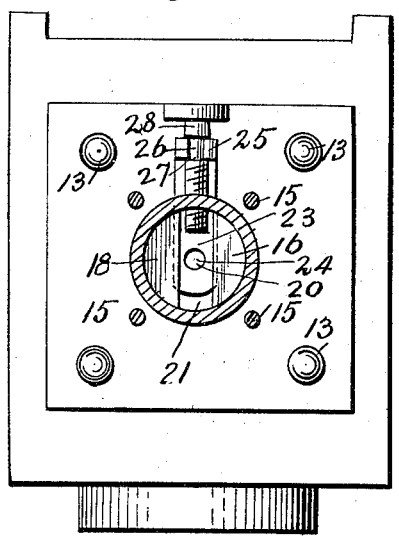
Figure 3:
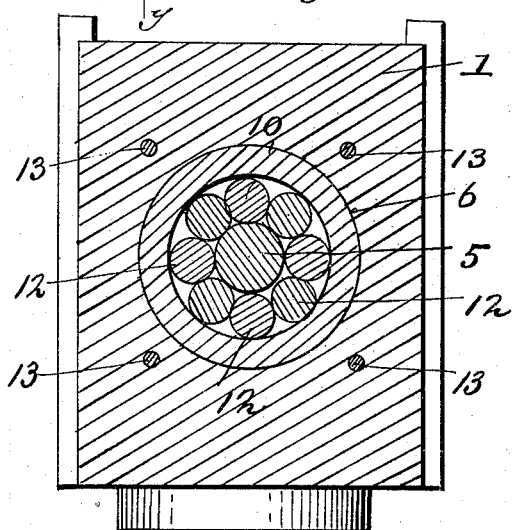
Figure 4:
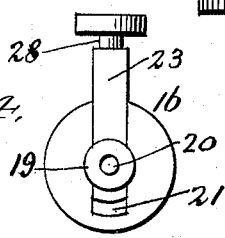

In the accompanying drawings, Figure 1 is a longitudinal sectional view of a journal or axle box. Fig. 2 is a vertical section on the line $x$ $x$, Fig. 1. Fig. 3 is a similar view on the line $y$ $y$, Fig. 1.

In the said drawings the reference-numeral 1 designates a metal box or casting having a central longitudinal opening 2 for the passage of the journal or bearing 4 of a car or other axle 5. At each end this box is formed with cylindrical recesses 6, with which the opening 2 centrally intersects, and seated in these recesses are removable circular wear-plates 7, connected together by pins or bolts 8. It will be seen that these recesses are of considerably larger diameter than the said opening 2.

The numeral 9 designates rectangular end plates provided with inwardly-extending annular flanges or bosses 10. These flanges fit snugly in the recesses 6 and are of a diameter greater than the opening 2, so that when the axle or journal is inserted in said opening there will be an annular space between the inner surfaces of the flanges and the journal. Located in these spaces are a number of rollers 12, which form the bearings for the journal.

The numeral 13 designates screw-bolts passing longitudinally through the box and the heads and provided with nuts 14, by which the heads are held securely in place. The axle or journal passing through the opening 2 does not contact with the wall thereof, but passes loosely therethrough and is supported directly and entirely by the rollers at each end of the box. By this means the friction is reduced to a minimum.

Secured to the outer head of the box by means of bolts 15 is an oil-cup 16, consisting of a cylindrical receptacle having a flange 17 at its outer end through which said securing-bolts 15 pass. This cup is formed with an oil-chamber 18, and at the inner end is formed a cylindrical plug 19, having a central opening 20. This plug fits in a central opening in the said hub and bears against the end of the axle or journal. In the inner end of said oil-cup, just in rear of the plug, is a vertical slot 21, in which fits a vertically-movable feed-slide 23, formed with an opening 24. The upper end of this slide projects above the oil-cup and is formed with a lug 25, having a recess 26 in its end. Engaging with this recess is the reduced portion 27 of a thumb-screw 28, the inner end of which engages with a screw-threaded opening in the oil-cup in such manner that when said screw is rotated the slide will be moved up or down, as the case may be.

In practice by turning the thumb-screw 28 the slide 23 will be moved up or down, according to the direction in which the screw is turned, so as to bring its opening 24 into or out of line with the opening in the plug, whereby the amount of oil fed to the journal through said opening may be regulated or altogether cut off.

Having thus fully described my invention, what I claim is—

The combination with a journal-box, of the oil-cup bolted to the outer head thereof and formed with an oil-chamber, the plug fitting in an opening in the head of the box and provided with a central opening and the inner end of said cup formed with a vertical slot, the vertically-movable slide having an opening therein and provided at the upper end with a recessed lug, and the thumb-screw having a reduced portion engaging with said lug, substantially as described.

In testimony whereof I have hereunto set my hand in presence of two subscribing witnesses.

ALPHEUS FRENCH WARREN.

Witnesses:
 SAMUEL MCBRIDE,
 M. S. SPOHN.